United States Patent [19]

Sonne

[11] Patent Number: 4,918,314
[45] Date of Patent: Apr. 17, 1990

[54] GAIN STABILIZATION CIRCUIT FOR PHOTOMULTIPLIER TUBES

[75] Inventor: Darrell S. Sonne, Katy, Tex.

[73] Assignee: Halliburton Logging Services, Inc., Houston, Tex.

[21] Appl. No.: 293,916

[22] Filed: Jan. 6, 1989

[51] Int. Cl.$^4$ .............................................. G01T 1/28
[52] U.S. Cl. ..................................... 250/369; 250/262
[58] Field of Search ................................ 250/262, 369

[56] References Cited

U.S. PATENT DOCUMENTS 4,272,677 6/1981 Berthold et al. ................. 250/252.1

FOREIGN PATENT DOCUMENTS 475928 3/1975 Australia ............................. 250/262

Primary Examiner—Constantine Hannaher
Attorney, Agent, or Firm—William J. Beard

[57] ABSTRACT

A photomultiplier tube stabilization circuit is set forth. It is particularly useful in downhole logging tools exposed to increases in temperature and to overcome component aging and drift. A high voltage power supply is connected for operation of a photomultiplier tube. The output of the PMT is amplified and applied to a set of comparators forming logic levels associated with threshold values affiliated with the spectral peak anticipated for the output data. The high voltage power supply is controlled upwardly or downwardly to vary operation of the PMT by means of a relatively simple control loop utilizing the comparators and means forming a control voltage for the high voltage power supply.

8 Claims, 2 Drawing Sheets

4,918,314

GAIN STABILIZATION CIRCUIT FOR PHOTOMULTIPLIER TUBES

BACKGROUND OF THE DISCLOSURE

This disclosure is directed to a circuit for operation of a photomultiplier tube (PMT) installed in logging tools lowered into oil and gas wells. It is intended for use in a logging tool which can be used both during drilling and after completion of an oil well. It can also be used to service an already existing well. The particular logging tool is the type of tool which incorporates one or more PMTs to measure scintillation events including those which may occur naturally or those which are induced. It is particularly useful for induced scintillation events where the surrounding formations are irradiated with radiation or particles and which respond with an output forming a spectral peak. It will be described in the context of forming a response to the 660 Kev spectral peak associated with cesium-137 isotope. Such an irradiation source is often used in logging tools, as for example, in tools for measuring formation density.

In a typical logging tool a source of radiation is placed in a sonde. It will typically emit neutrons or gamma radiation. In its use, long and short detectors are installed on the sonde, and as is understood by those familiar with logging, the short detector is located close to the source, and the long detector is located remote from the source. Typically, the long and short detectors are practically identical and form output signals which differ primarily in scale resulting from the difference in spacing. Accordingly, the present disclosure is directed to an improved system which can be used in both the long and short detectors.

The downhole environment encountered by a logging tool includes exposure to constantly increasing temperatures with depth. Electronic equipment is ordinarily sensitive to increases in temperature. Accordingly, a logging tool which is lowered into a deep well will change in operation, drifting from surface calibration points, and providing different outputs. One approach to overcoming this is to place certain key elements within a thermal insulating flask. Such a device, however, is costly to build, has limited interior room and heat will eventually accumulate within the flask. Another approach is to utilize expensive gain stabilization circuits. It is suggested that the present procedure is remarkably more desirable than typical gain stabilization circuits, and it also avoids the requirement of installation in a flask to exclude external heat.

The detection and quantification of scintillation events begins with a scintillation detector, and the preferred form of detector is a solid crystal body, the preferred form being NaI. It provides a desirable response, but is sensitive to temperature. Moreover, it does not warm up evenly so that different portions of a typical measuring device featuring an NaI crystal may have temperature gradients across the crystal body; the crystal itself may impose drift on the system as temperatures change. Temperature drift and loss of stability can obscure data obtained from logging. It is particularly a problem in that the PMT operates with a high voltage supply system and involves various stages of amplification. Moreover, signal discrimination must be implemented and that level may vary over time. Not only is there drift as a result of temperature, but manufacturing variations are also introduced. Aging variations also occur. It is possible for the count rate to be several percent unstable, and this can materially impact the acquired data. This is a drift level often unacceptable because it completely obscures data quality. The present disclosure is directed to a very simple, surprisingly proficient system whereby PMT amplification in spite of temperature and aging is controlled. It involves the use of a gain stabilization circuit which is connected to the high voltage power supply for the PMT. This includes a output amplifier which applies the PMT output signal to a amplifier system connected to a set of comparators. Each comparator has an input voltage which defines a threshold value, and thereby serves as a discriminator. The output of the comparators is connected to a simple logic circuit which provides a control signal for a pulse generator connected to a digital-to-analog converter. That in turn provides an analog control signal for a high voltage power supply (HVPS) connected to the PMT. The voltage for the power supply is adjustable, and under this control, amplification is changed by changing the high voltage applied to the PMT across the cathode and anode thereof. The HVPS can be either negative or positive.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not o be considered limiting of its scope, for the invention may admit to other equally effective embodiments.

In the Drawings:

FIG. 1 shows a typical sonde enclosed logging tool in a well and which tool incorporates long and short detectors for making measurements as a result of irradiation of adjacent formations;

FIG. 2 shows a schematic block diagram of a stabilization circuit for use with a PMT in accordance with the teachings of the present disclosure;

FIG. 3 is a spectral peak showing gain stabilization wherein the spectral peak is divided by control of the comparators in the circuit shown in FIG. 2;

FIG. 4 is a detailed circuit drawing showing a ramp up circuit with the signal discrimination circuit; and FIG. 5 is a detailed logic circuit having a lockout function for discriminator ouput signals.

DETAILED DESCRIPTION OF THE PREFERRED EMBODIMENT

Figure 1:
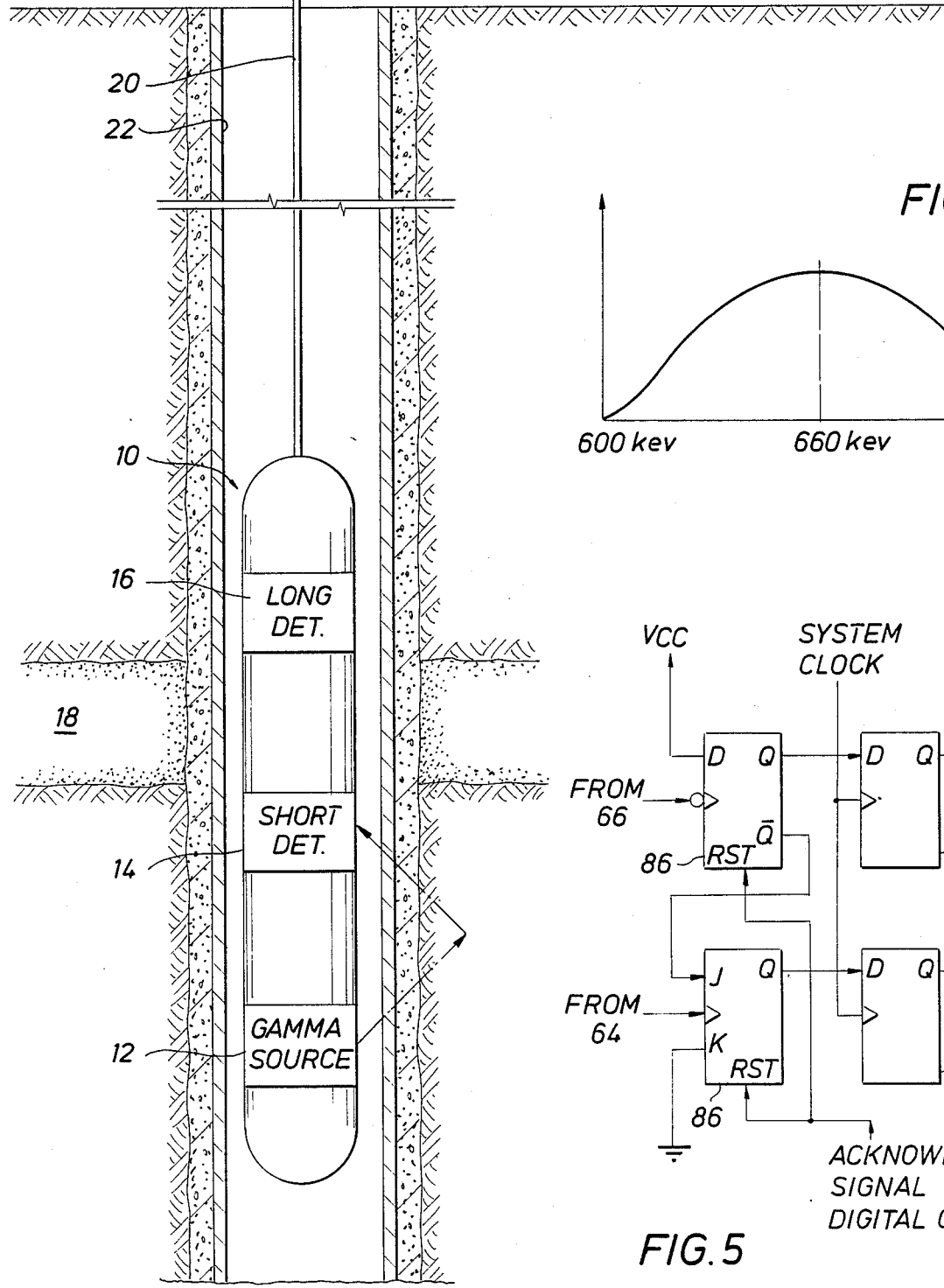

Attention is now directed to FIG. 1 where the numeral 10 identifies a sonde lowered into a well borehole for logging purposes. This particular sonde includes a radiation source 12, a short detector 14 and a long detector 16. The detectors 14 and 16 differ primarily in location and hence, in size, and are chemically the same. Their output signals are different by virtue of the proximity to radiations source 12. All the equipment shown in the sonde 10 is enclosed within the case or housing making up the sonde. It is possible to include a thermal flask in the sonde to receive equipment therein to isolate the equipment from the surrounding heated environment. Such a device, however, has limited capacity, and its use is preferably avoided if at all possible. The source 12 emits controlled gamma radiation to react with the surrounding earth such as the formation 18. The spectrum observed at the detectors 14 and 16 provides data which can be interpreted to make appropriate measurements regarding the formation 18.

A logging cable 20 supports the sonde 10 in the well. The well is shown as a cased well with a casing 22, but this present invention can also be used with a logging tool in open hole. The logging cable supports one or more conductors and has a strength member. It extends to the surface and passes over a sheave 24 and is spooled or stored on a drum or reel 26. It provides output data through the conductors in the logging cable, and the signals are thus applied to a CPU 28, and are thereby converted into appropriate signals for storage. The output data from the CPU is delivered to a recorder 30 and the data is recorded on some suitable media. The data is preferably recorded as a function of depth, and to this end, a mechanical or electronic depth measuring apparatus 32 extends from the sheave 24 to the recorder 30.

In operation, the logging tool is lowered to the bottom of the well, retrieval is initiated and measurements are made as the sonde 10 travels along the well. Measurements are made of all the formations including the formation 18, and the data is output on the logging cable 20 and is ultimately recorded at the recorder 30.

Figure 2:
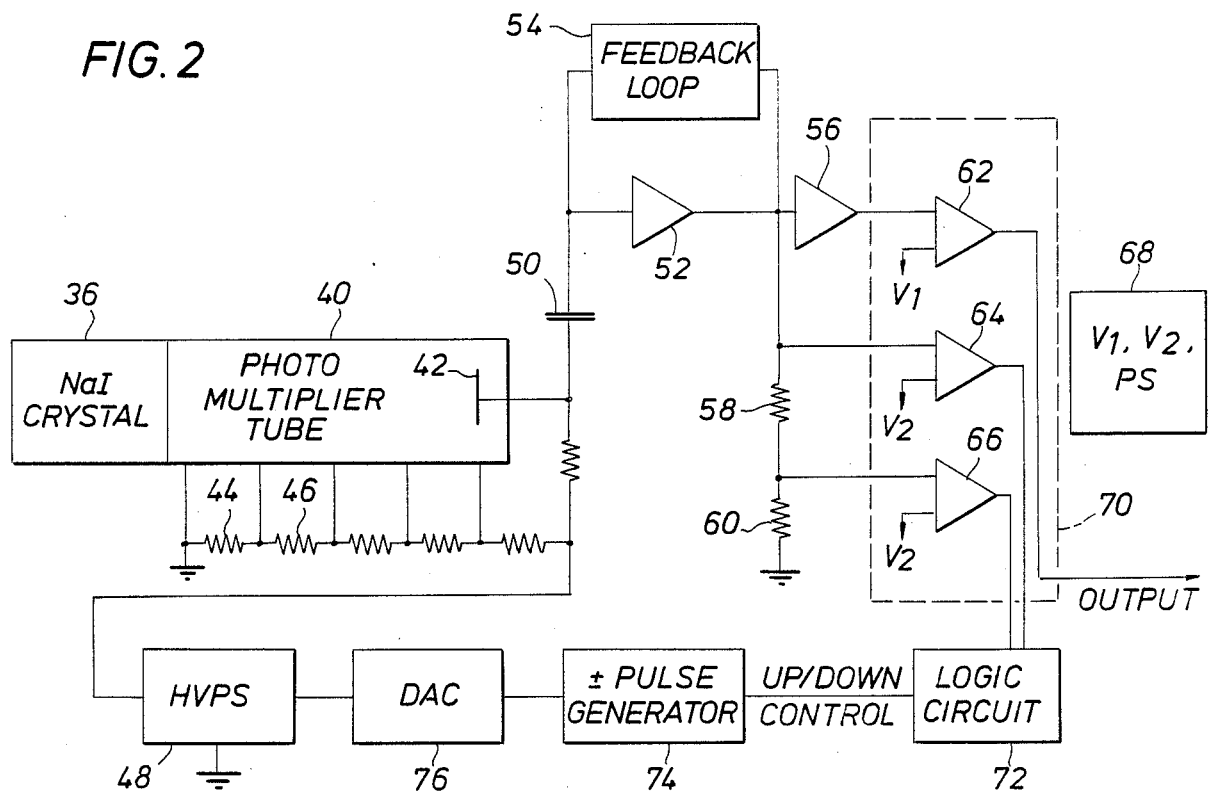

Attention is now directed to FIG. 2 for a description of a certain portion of the apparatus included in each of the detectors 14 and 16. This equipment includes means which is responsive to the scintillations resulting from formation irradiation. It is possible to use a geiger tube, but the preferred form of detector is NaI crystal shown at 36. It is positioned immediately adjacent to and in operative relationship to a PMT 40. The PMT has been partially illustrated to include the anode 42. It is constructed with a number of intermediate taps connected to a string of series resistors at 44, 46, etc. The cathode (not shown) is connected to the most negative voltage point. A high voltage power supply 48 is incorporated to provide appropriate voltage for operation of the PMT. The negative side of the HVPS is grounded, and has an output conductor which connects with the resistor string. It is typically maintained at a selected voltage level positive with respect to the cathode. Operation of the PMT in conjunction with the crystal 36 occurs in the following manner. A scintillation event occurs within the crystal body, and is converted into several photons of light. These photons are observed by the PMT. The PMT is constructed with a series of intermediate dynodes functioning in the well known manner to provide amplification. The multiple dynodes are connected to the resistance ladder connected between ground and the HVPS 48.

Typical operation involves placing the cathode at ground level. Typically, a high voltage blocking capacitor 50 is connected from the anode to a feedback amplifier 52 having a feedback circuit 54. The output is then developed across a resistor network including the resistors 58 and 60. Relative values are selected so that connected circuitry will operate in the intended fashion as will be described. This resistance network provides output voltages for three comparators identified at 62, 64 and 66. They are provided with an appropriate comparative voltage from appropriate power supply at 68. Comparator 62 provides an overall measurement output and has nothing to do with the stabilization circuitry.

The amplifier 56 sets the threshold of the overall measurement output. An important factor is that the comparators are all mounted on a common heat sink 70 and indeed are typically manufactured and supplied as multiple circuit components from a single integrated circuit component. That is, a single component is typically used and thus the several comparators share common thermal deviation. More will be noted regarding this hereinafter. The outputs have the form of logical signals connected to a logic circuit 72. The circuit is switched periodically to provide an up or down control signal for a pulse generator 74. That in turn provides appropriate pulses to a digital to analog converter. This is converted from digital signals into an analog control signal by the converter 76. That signal is applied to the control terminal of the HVPS 48 which varies the voltage applied to the PMT 40.

Figure 3:
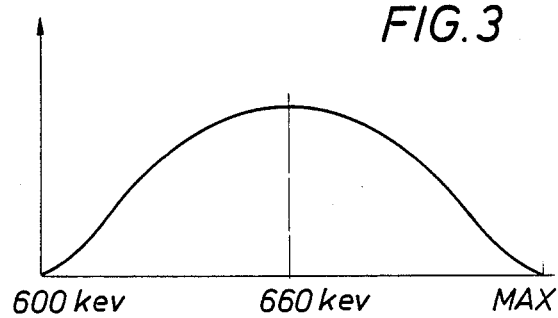

Attention is now directed to FIG. 3 of the drawings. This is typical of the spectral peak and in particular the one obtained from cesium-137 as a source. Briefly, the peak shown in FIG. 3 centers at 660 Kev. Observable data is seen at 600 Kev and extends on up to some maximum value. If it is known that 660 Kev represents the center of the peak, the PMT is adjusted so that half the pulses are above the peak at 660 and half are below. Restated, the spectral peak centered at 660 Kev is used in this particular instance (the peak is dependent on the source) so that all the amplified pulses exceed the threshold setting of 600 Kev. By means of an appropriate discriminator, pulses at or above the 600 Kev level are observed by exceeding the threshold, while 660 is used for a second threshold value.

Assume for purposes of discussion that the voltages across the PMT is insufficient. That would be countered by increasing the signal for the HVPS 48 to cause it to provide more voltage. This would then increase the voltage across the PMT, change the gain and thereby increase the amplification. The output of the PMT is thus appropriately controlled by the circuitry connected to the anode 42 and a suitable voltage is developed across the resistors 58 and 60. The relationship of the resistors 58 and 60 is particularly important. Assume for purposes of description that the resistor 60 has a value of 10 kiloohms. If the resistor 58 has a voltage of one kiloohm, a ratio of 10/11 is defined by the two resistors, and that corresponds to the ratio of 600/660 referring to FIG. 3. The gain of amplifier 56 can be adjusted so that a multiplication of 10 is input to the comparator 62. Thus, consider the typical following instance. An event occurs in the crystal 36 and is observed by the PMT 40 which forms an amplified output pulse. The pulse is amplified and developed across the two resistors and amplifier 56 as mentioned. Note particularly the interplay between the comparators 64 and 66. Assume first of all that the event is so small that it falls well below the spectral peak shown in FIG. 3. Then in that instance, nothing occurs because the event does not trigger operation of either of the two comparators. Assume, however, that the pulse relates to an event between 600 and 660 Kev. In that instance, the comparator 64 will form a logic signal indicative of that event. No signal, however, will be formed by the comparator 66. In this example, the resistor divider attenuated the pulse below the threshold level of comparator 66. From the foregoing, it will be understood how the comparators can be set so that they provide output pulses for control purposes. The control relationship among the output pulses is determined by the spectral distribution of pulses as evidenced in FIG. 3. A pulse out of the logic circuit is usually produced for each event which is observed by the PMT and trips the comparator 64. The pulses can then be integrated because the logic circuit provides an up/down control signal for the pulse generator 74.

The logic circuit 72 thus responds to the following states referring to the outputs of the comparators 66 and 64 see the discussion below regarding FIGS. 4 and 5.

The four logic level combinations are easily converted into signals providing up and down control for the pulse generator 74. Incrementing through the DAC 76 thus provides the control for the HVPS 48. Typical scale values might be noted. The output of the HVPS is typically in the range of +1200 to +1500 VDC. The control voltage for the HVPS 48 is in the range of about +2V to +13V. Normally, it is stabilized at a voltage of about +8V and varies above or below to cause variation in output thereby altering the gain of the PMT. The DAC 76 is thus operated to provide an output centered in this range, and fluctuates above or below to provide the necessary control. In turn, it is driven by pulses from the generator 74 which increment or decrement (see the analog value described below) the value in the DAC to thereby control the HVPS. Variations in gain of the PMT change the output shape of the spectral peak typified in FIG. 3. This shape is brought back to the desired pulse distribution by operation of the control loop described above.

Figure 4:
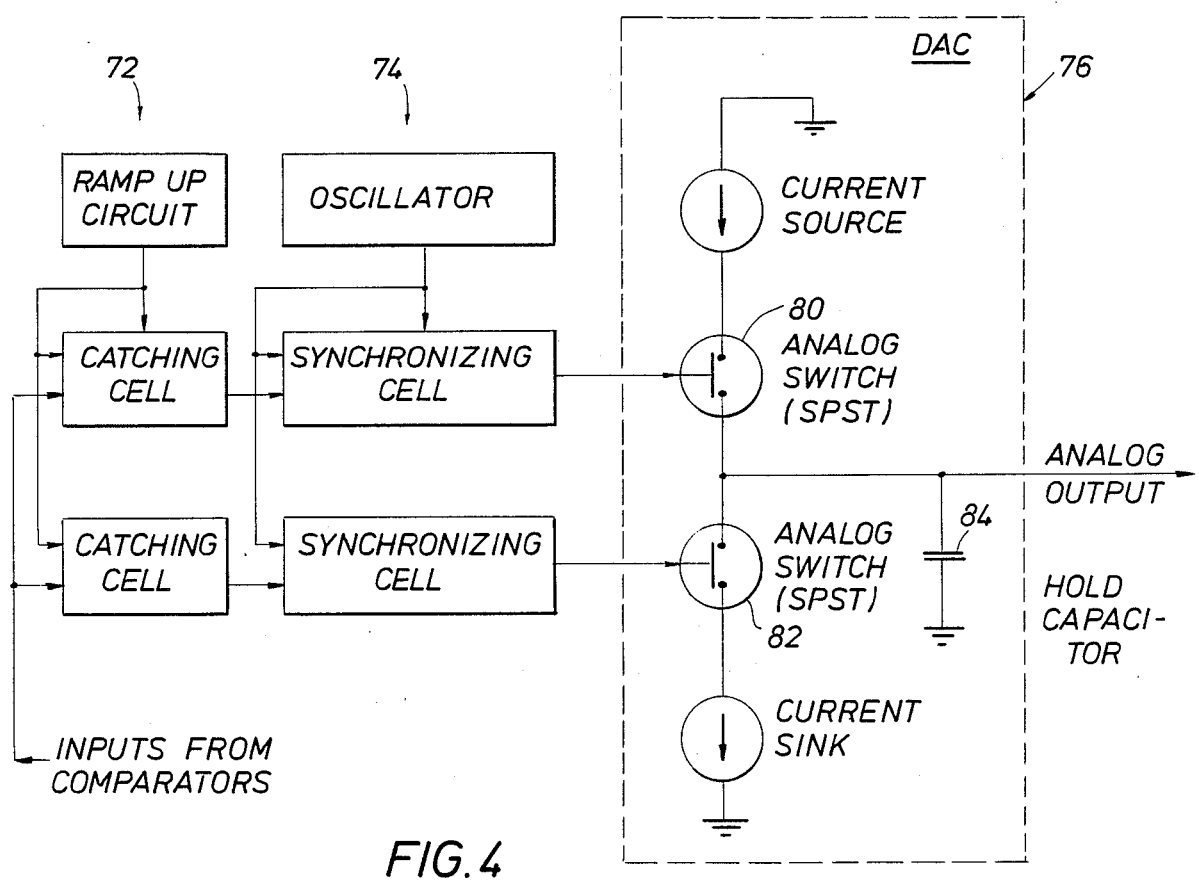

Attention is now directed to FIG. 4 of the drawings which shows one form of circuitry converting the signals into a control analog signal for the HVPS 48. This circuitry incorporates specific forms of the logic circuit 72, the pulse generator circuit 74 and the digital to analog circuit 76. Briefly, the logic circuit 72 involves the situation of synchronizing randomly occurring inputs through the use of catching cells at 72 which are input to synchronizing cells. There are two catching cells which communicate with two synchronizing cells. The catching cell is a device believed to be well known which is typically a flip flop clock or set by the leading edge of the randomly occurring unsynchronized input pulse. The catching cell is thus triggered and remains set until the synchronous logic of the system processes the signal. The synchronous signal then causes a reset for the catching cell. Thus, the catching cells are periodically reset after being randomly placed in the set state. The two synchronizing cells are again additional flip flops having inputs connected to the outputs of the catching cells. The synchronizing cells are clocked by the system clock such as an oscillator as shown in FIG. 4. The synchronizing cells form output signals only on clock control. The synchronizing cell outputs are then routed to the DAC 76. The DAC thus is synchronized with the oscillator and is therefore able to form a fixed duration pulse of current for capacitor charging.

One result of the synchronization scheme described above is that only one pulse can be processed during a clocked period. Recall that the pulse has from the crystal 36 in a random fashion. This points to the fact that it is probable that more than one pulse may arrive during a fixed clock interval. In other words, two or more pulses may occur before resetting of the system. Obviously, this probability depends on the count rate of the phenomenon being observed, and it also depends on the clock rate of the system. If the clock rate of the system is shorter duration, the probability is reduced. This clock stabilized process assures that all pulses have the same probability of being processed without regard to pulse amplitude. In the DAC shown in FIG. 4, analog switches 80 and 82 are switched off and on in accordance with the clock rate so that output pulses of current for the storage capacitor 84 are of uniform length or duration. In other words, they are tied to pulse rate, but they are not dependent on pulse amplitude.

Figure 5:
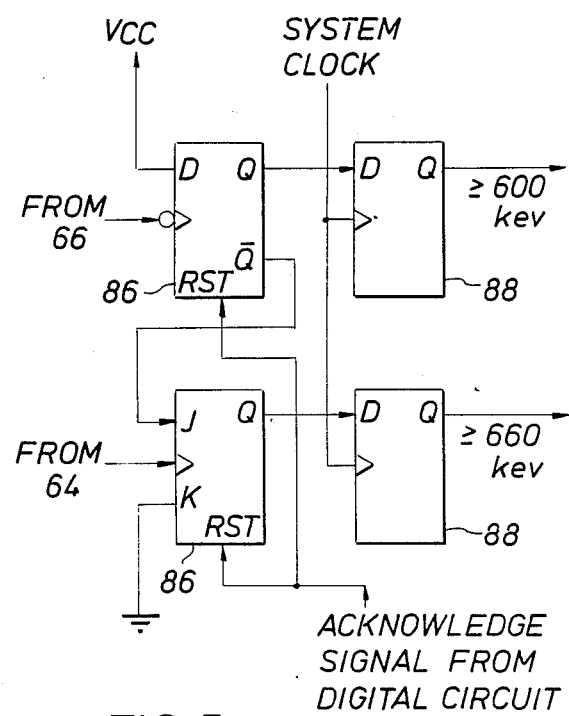

FIG. 5 shows detailed connections for the flip flops used as catching and synchronization cells. Duplicate flip flops at 86 and 88 are incorporated so that both signals are provided. It is important to note that the input to the flip flops 86 are from the comparators 64 and 66. The outputs are thus related to the energy levels at 600 kev and 660 kev in FIG. 3. From this system, one can therefore obtain the following timing chart as it relates to pulse height. If the pulse height is under 600 kev nothing is triggered in the circuitry of FIG. 5. If the pulse height is between 600 and 660 kev, it is detected by the comparator 66 which detects this lower threshold value. It therefore operates for an instant and then returns to its quiescent state. That provides the signal from the comparator 66 to the logic circuitry in FIG. 5 for operation. Should the pulse height be equal to or greater than 660 kev, both comparators are tripped, both make excursions and then return to the quiescent state. The lock-out accomplished by this causes only the first pulse arriving during each clock cycle to be processed. By processing only the first pulse during each cycle of operation, smaller and larger pulses are treated equally, that is, pulse amplitude has no impact.

While the foregoing is directed to the preferred embodiment, the scope thereof is determined by the claims which follow.

What is claimed is:

1. A control system for stabilization of a photomultiplier tube having an anode circuit and which is responsive to scintillation events detected in a scintillation detector wherein the photomultiplier tube forms an amplified output at the anode of such events, and wherein the stabilization circuit comprises:
   (a) amplifier means connected to said photomultiplier tube output at the anode for forming a controllably sized output from said photomultiplier tube;
   (b) first and second amplitude comparator means connected to the output of said amplifier means for converting the output thereof to logic levels dependent on amplitude of the signal from the photomultiplier tube, and wherein said logic levels comprise a control signal;
   (c) a lockout circuit cooperative with said comparator means to limit operation of said comparator means to separate input pulses of specified amplitude in a given interval;
   (d) means responsive to said control signal for forming a variable control voltage; and
   (e) high voltage power supply means for said photomultiplier tube controllably operated to form a variable high voltage output for said photomultiplier tube in accordance with the control signal applied thereto.

2. The apparatus of claim 1 wherein said photomultiplier tube is constructed with intermediate terminals between the anode and cathode thereof, and said high voltage power supply connects serially to all of said intermediate terminals to provide operating voltage therefor.

3. The apparatus of claim 2 wherein said photomultiplier tube is operatively positioned adjacent a NaI crystal to observe scintillation events therein.

4. The apparatus of claim 1 for cooperation with a cesium-137 neutron source characterized by a spectral peak at 660 Kev, and further wherein said control system stabilization circuit includes a DC blocking capacitor connected from the anode of the photomultiplier tube to said amplifier means.

5. The apparatus of claim 1 wherein said amplifier means develops an output voltage across a multiple resistor series load having at least a pair of output terminals therein and said output terminals are connected with said first and second amplitude comparator means.

6. The apparatus of claim 1 wherein said responsive means and said high voltage power supply means form an anode voltage for operation of the photomultiplier tube, and said anode voltage is raised or lowered dependent on operation of said control signals from said first and second comparator means, and said responsive means incrementally steps said high voltage power supply means.

7. The apparatus of claim 1 wherein said comparator means incorporates said lockout circuit therein for preventing operation in response to a subsequent or other following input pulse after the single input pulse of specified amplitude so that following pulses are excluded until the completion of one cycle of operation thereof.

8. The apparatus of claim 1 wherein:
(a) said photomultiplier tube is operatively positioned adjacent a NaI crystal to observe scintillation events therein;
(b) said control system stabilization circuit includes a DC blocking capacitor connected from the anode of the photomultiplier tube to said amplifier means;
(c) said amplifier means develops an output voltage across a multiple resistor series load having at least a pair of output terminals therein and said output terminals are connected with said first and second amplitude comparator means;
(d) said responsive means and said high voltage power supply means form an anode voltage for operation of the photomultiplier tube, and said anode voltage is raised or lowered dependent on operation of said control signals from said first and second comparator means, and said responsive means incrementally steps said high voltage power supply means; and
(e) said comparator means incorporates said lockout circuit therein for preventing operation in response to a subsequent or other following input pulse after the single input pulse of specified amplitude so that following pulses are excluded until the completion of one cycle of operation thereof.

* * * * *